United States Patent

[11] 3,575,105

| [72] | Inventor | Ralph Painter |
| | | Glendale, Ark. |
| [21] | Appl. No. | 844,085 |
| [22] | Filed | July 23, 1969 |
| [45] | Patented | Apr. 13, 1971 |
| [73] | Assignee | Arcoa Incorporated |
| | | Phoenix, Ariz. |

[54] TRANSFER ASSEMBLY
10 Claims, 5 Drawing Figs.

[52] U.S. Cl. ..................................................... 101/35,
214/1, 104/131
[51] Int. Cl. ....................................................... B65g 7/00
[50] Field of Search ........................................... 214/1 (R),
1; 101/35

[56] References Cited
UNITED STATES PATENTS
2,557,228   6/1951   King et al. ..................... 214/1(R)
3,408,928   11/1968  Perry .............................. 214/1(R)X

*Primary Examiner*—Gerald M. Forlenza
*Assistant Examiner*—Frank E. Werner
*Attorney*—David H. Semmes ABSTRACT: Transfer assemblies, particularly an assembly rotatable 180° to transfer an object from one horizontal plane to another horizontal plane, while inverting the object, the device including an open-ended cylinder having a miter bracket for slidably supporting the object to be transferred.

INVENTOR
RALPH PAINTER

BY

ATTORNEY

INVENTOR
RALPH PAINTER
BY
ATTORNEY

INVENTOR
RALPH PAINTER
BY
ATTORNEY

TRANSFER ASSEMBLY

BACKGROUND OF THE INVENTION

1. Field of the Invention

The present invention concerns transfer assemblies of the type used for transferring objects which have been painted, heat treated, or the like from one conveyor line or manufacturing station to another. Many such transfer assemblies include means for inverting the object in the course of transfer, so that the underside may be painted or treated at the other station. For the most part, the devices have been complex and, therefore, expensive and subject to breakdown.

2. Description of the Prior Art

Earlier inventors have devised cylindrical turnover or inverting transfer devices. Prior art searching has developed the following:

King, U.S. Pat. No. 2,557,228;
Temple, U.S. Pat. No. 3,089,598;
Bruce, U.S. Pat. No. 3,395,813; and
Burgher, U.S. Pat. No. 3,429,456.

King, Burgher, and Temple are typical of cylindrical devices for inverting a load. King uses channel or "guide rails" for securing the object to be turned. Burgher, as well as Bruce, use clamps to hold the object during turning.

None of these earlier inventors have approached applicant's concept wherein a simple open-ended rotatable cylinder is provided with a miter bracket which is complementally engageable with corresponding miter edges on the pan or object to be inverted. The cylinder rotates 180° from a position where the miter bracket is at the bottom to a position where the miter bracket is at the top. The pan is slid horizontally into and out of the bracket.

SUMMARY OF THE INVENTION

According to applicant's invention, a heated-type casing, pan, or the like may be transferred from one station, such as a hot plate, to another work station, such as a printing press. The device includes an open-ended cylinder rotatably supported upon a base interposed, for example, between the hot plate and the printing press. The cylinder includes a miter bracket supported as a chord within said cylinder and aligned in its bottom position with the hot plate top, so that the pan having complementally mitered side edges may be slid from the pan top into the bracket. The cylinder is then rotated 180° so as to invert the pan and present the pan in its top position in alignment with a printing press having a miter bracket aligned with the cylinder bracket. The pan is then slid through the cylinder and into the printing press bracket.

The assembly is simple, durable, and efficient. The pan can be moved from hot plate to printing press by the use of one hand of the operator and lifting is totally eliminated.

DESCRIPTION OF THE PREFERRED EMBODIMENTS

Figure 1:
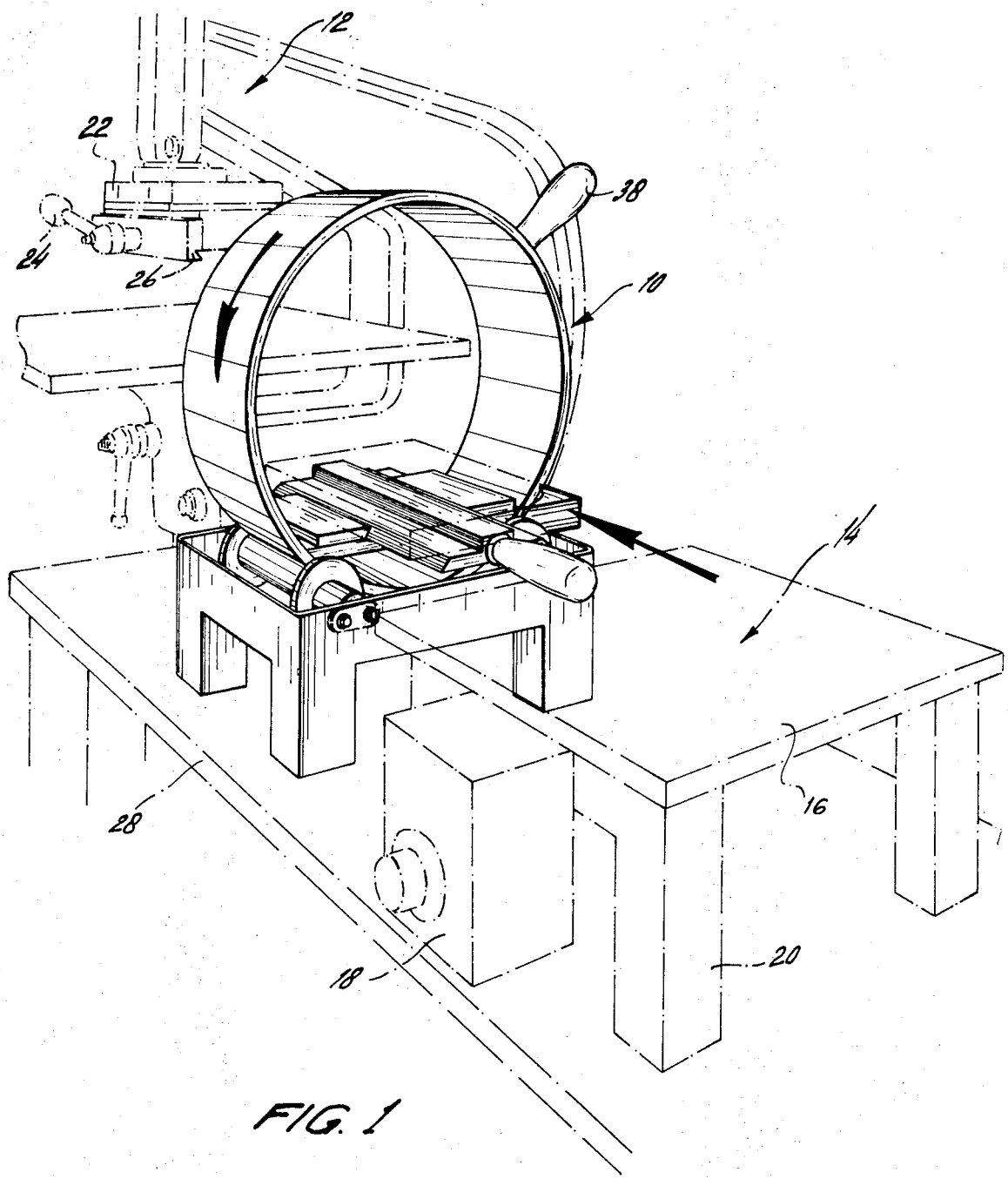
FIG. 1 is a perspective view showing the open-cylinder transfer assembly interposed between a hot plate in the foreground and a vertically reciprocable printing press in the background.

In FIG. 1 an open-ended cylindrical transfer device 10 is illustrated as supported upon table 28 and interposed between hot plate 14 and printing press 12. Hot plate 14 may include a heated top surface 16 supported upon upstanding legs 20 and regulated by rheostat or like device 18. The printing press 12 may include vertically reciprocable carriage 22 supporting opposed bracket members 26 each having radially outwardly inclined mitered edges. The carriage 22 is vertically reciprocated by pivoting of handle 24.

In FIGS. 2—5, the transfer device is illustrated as comprised of an open-ended cylinder 32 rotatably supported within base or frame 30. Cylinder 32 has a bracket 34 supported as a chord within the cylinder and secured at either end by welding, setscrew, or like means extending into the cylindrical surface. A pair of opposed plates 36 having radially outwardly extending miter edges 37 are secured to the base 34 so as to define a path of longitudinal conveyance through the cylinder. The cylinder may be supported upon a pair of tubes or pipes 52 rotatably secured in base 30 by means of stove bolts 50 and nylon rollers 48. A pair of collars 54 may be secured to pipes 52 by means of a setscrew or the like, so as to limit longitudinal play of the open-ended cylinder during rotation. A peripherally extending handle 38 may be secured threadedly or by welding or by bolt means, so as to assist in rotating the cylinder through its arc of 180° from the bottom position illustrated in FIG. 1 to the top position illustrated in FIGS. 2 and 3.

Figure 2:
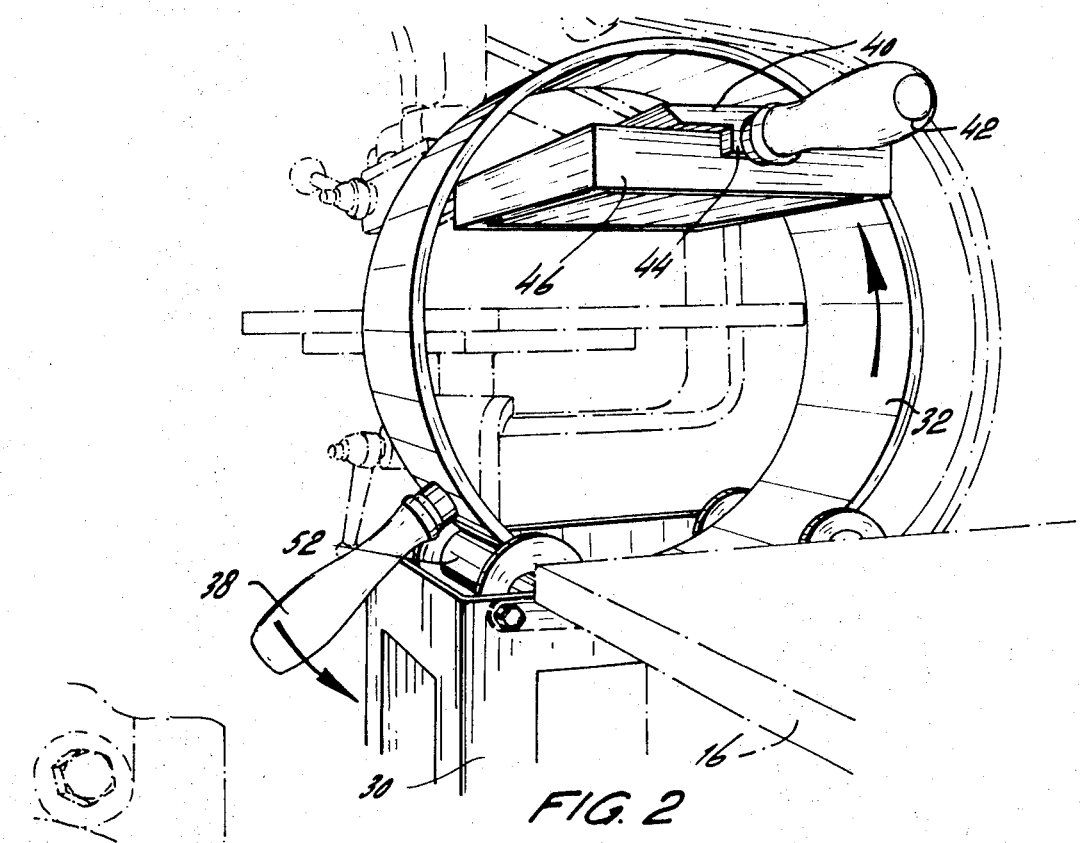
FIG. 2 is an enlarged perspective, showing the hot plate in fragment and the cylinder rotated from the FIG. 1 bottom position to the inverted top position where the pan is aligned with the bracket in the printing press.
Figure 3:
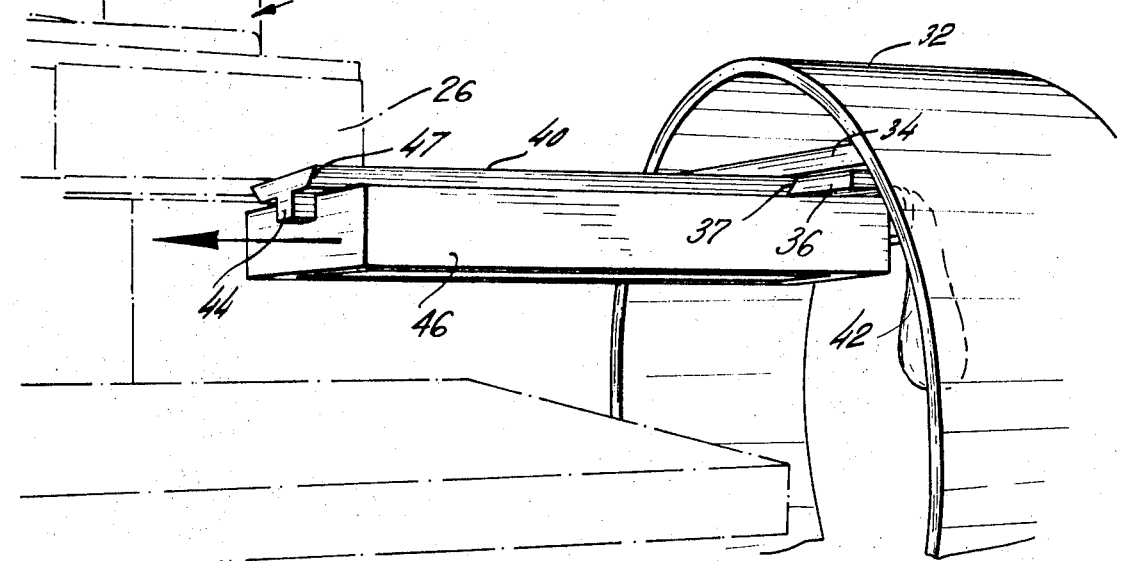
FIG. 3 is an enlarged fragmentary perspective, showing the sliding of the pan in top position within a single horizontal plane from the cylinder bracket into a corresponding, aligned bracket in the printing press.
Figure 4:
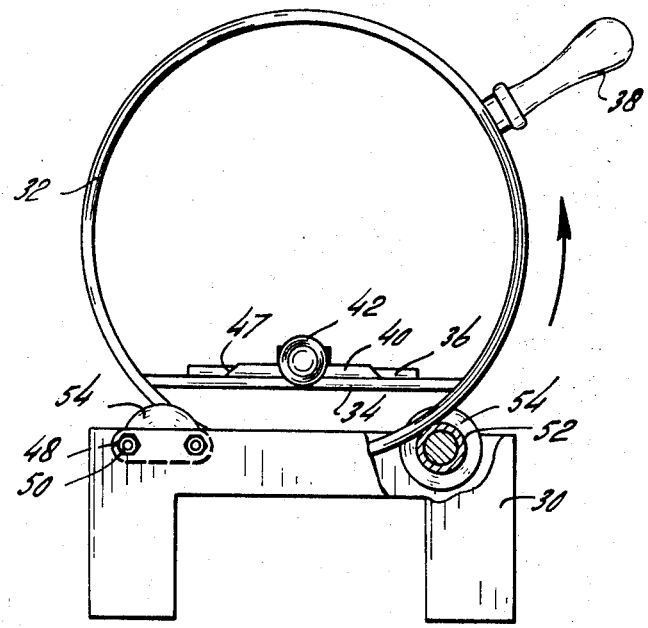
FIG. 4 is a front elevation of the cylinder, partially in section, showing the engagement of the mitered pan and bracket surfaces, as well as the rollers supporting the cylinder.
Figure 5:
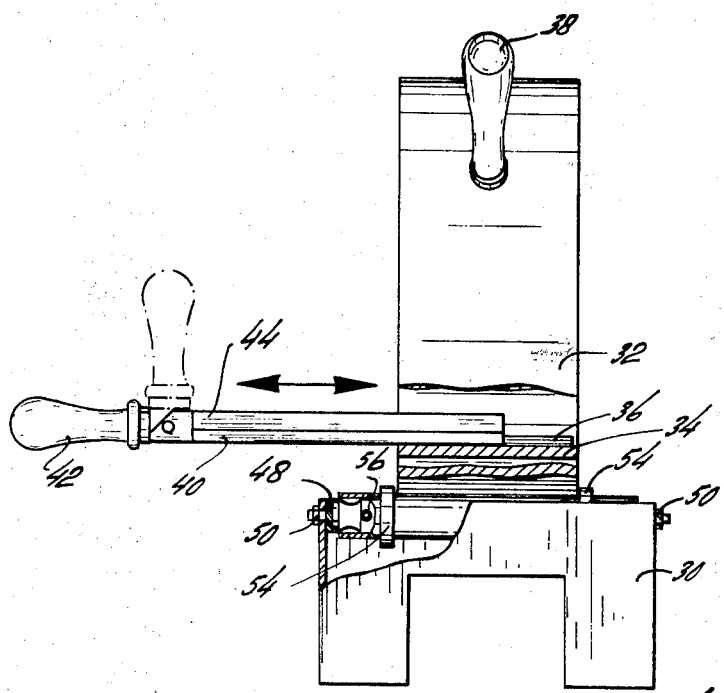
FIG. 5 is a side elevation, partially in section, showing the rotatable support of the open-ended cylinder.

In FIGS. 2 and 3, the pan to be transferred is illustrated as comprised of a base 40 having opposed radially outwardly inclined edges 47 and a vertical middle ridge 44. Edges 47 complementally engage the bracket edges 37 so as to securely hold the entire assembly during the rotation phase. A collection box 46 or the like having a longitudinal concavity engages ridge 44 and may be secured to the base 40 by any suitable means.

In FIG. 1 the pan is shown in bottom position as it is being pushed from the top of the hot plate in a horizontal plane into bracket 34. Thence, handle 38 may be grasped so as to rotate the cylinder 180° raising the pan to the top positions illustrated in FIGS. 2 and 3. In this top position, the pan is slid in a horizontal plane, as illustrated in FIG. 3, from the cylinder bracket 34 to the aligned printing press bracket 26. Thence, the printing operation can be conducted.

Manifestly, the transfer assembly is not limited to printing situations and may be employed whenever it is desired to transfer and invert an object from one station to another.

I claim:

1. A transfer assembly comprising:
   A. base member;
   B. an open-ended cylinder rotatably supported in said base, so as to define a path of longitudinal conveyance extending above said base member;
   C. a miter bracket supported as a chord within said cylinder and having a mitered groove extending transversely of said cylinder; and
   D. a pan having its edges mitered complementally with said bracket so as to be slidable through said mitered groove and said bracket from one end of said cylinder and the other end.

2. A transfer assembly as in claim 1, said miter bracket mitered groove having its walls radially outwardly inclined and said pan having side edges being radially outwardly inclined, so as to support said pan in any attitude of rotation of said cylinder.

3. A transfer assembly as in claim 2, said miter bracket including:
   i. a base secured at each end to opposed points upon said cylinder;
   ii. a pair of miter plates supported upon said base, each miter plate having its inner edge radially outwardly mitered so as to define said mitered groove.

4. A transfer assembly as in claim 3, said pan having:
   i. a base member having radially outwardly inclined side edges and a vertically extending midridge, said side edges engaging said groove, so as to slidably support said pan adjacent said bracket; and
   ii. a collection box having a midconcavity complementally engageable with said midridge and secured thereto so that the bottom of the pan abuts the top of said base.

5. A transfer assembly as in claim 4, said pan having a handle secured at one end, so as to assist in pushing said pan through said groove and said open-ended cylinder.

6. A transfer assembly as in claim 5, said cylinder including a peripherally extending handle for rotating said cylinder within said base.

7. A transfer assembly as in claim 6, said cylinder base member including:
   i. a pair of rotatable pipes extending transversely of said base member and abutting opposed portions of said cylinder as a rotatable base.

8. A transfer assembly as in claim 7, said rotatable pipes in said base member including a pair of collar members supported upon each pipe so as to engage the edges of said cylinder.

9. A transfer assembly as in claim 8, in combination with a printing press having a miter bracket, aligned with the miter bracket within said cylinder when said cylinder is rotated so that said miter bracket is in top position, and complementally engageable with said pan base member side edges so as to receive and hold said pan as it slides horizontally from said miter bracket.

10. A transfer assembly as in claim 9, in combination with:
   E. a printing press supported at one side of said cylinder and having a bracket complementally mitered with said pan and aligned with said cylinder as said miter bracket is in top position, so as to slidably receive said pan when pushed through said cylinder; and
   F. a hot plate supported on the other side of said cylinder and in horizontal alignment with the cylinder miter bracket in its bottom position, so as to slidably feed said pan from said hot plate into said cylinder.